Jan. 30, 1968     E. H. EVALDS     3,366,843
THERMALLY RESPONSIVE ELECTRICAL CONTROL CIRCUIT
Filed Oct. 23, 1965
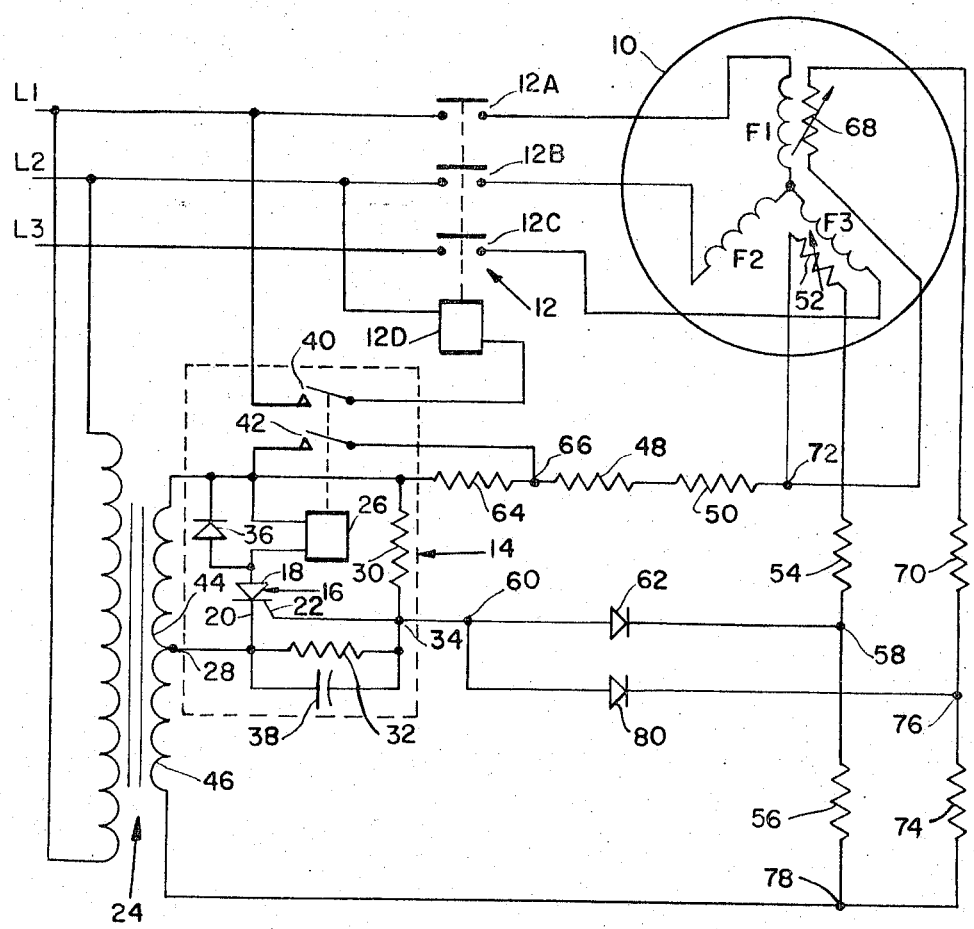
EGILS H. EVALDS    INVENTOR
BY *Robert L. Marben*
ATTORNEY

United States Patent Office 3,366,843
Patented Jan. 30, 1968

3,366,843
THERMALLY RESPONSIVE ELECTRICAL
CONTROL CIRCUIT
Egils H. Evalds, Ardmore, Pa., assignor to Robertshaw
Controls Company, Richmond, Va., a corporation of
Delaware
Filed Oct. 23, 1965, Ser. No. 503,500
21 Claims. (Cl. 317—13)

The invention presented herein relates generally to thermally responsive electrical control systems and more particularly to thermally responsive "fail safe" electrical control systems which are useful in protecting three phase electrical motors from being damaged due to overheating of the windings.

There is a need for a thermally responsive electrical control system which is extremely fast acting, permits the use of one or more sensors and "fails safe" if certain events occur. Such a system is particularly needed for the protection of three phase electric motors used to drive the compressors for refrigeration or air conditioning systems. The motors for such systems are hermetically sealed and utilize the circulating refrigerant to cool the motor. This permits the motors to be operated with higher currents than would be possible without such cooling. In the case of a stalled rotor the temperature of the windings of such motors therefore rises very rapidly to a level which is damaging to the windings. In a stalled rotor condition some motors will rise at the rate of 50° F. per second. This fast temperature rise must be detected rapidly and such sensing used to terminate the flow of current to the windings. Also, since the temperature rise to an unsafe level can be very gradual where circulation of the coolant is impaired to some degree or other overload conditions exist, it is necessary that the overload protector circuit used be capable of detecting and correcting for such unsafe temperature conditions.

Since it is possible for one of the power lines for a three phase motor to open causing the motor to operate as a single phase, it is not possible to use a single sensor for detecting the temperature at the windings to provide full protection. Operation of a three phase motor on a single phase will cause overheating of the windings if the load is near the rated value. Therefore more than one sensor is needed to sense the overheating condition caused by such single phase operation. It is also essential for detection of overheating during such single phasing of a three phase motor that the operation of the system not be dependent on any averaging of the temperatures sensed as is the case in systems where the sensors are in series. Further, it is desirable that each sensor be connected in the system without undesirable interaction between the sensors. In addition, it is necessary that the failure of any sensor cause the system to act as though an unsafe temperature condition has been detected so the system will "fail safe." Also, if a sensor should open for some reason, it is desirable that it be possible to by-pass the faulty sensor and still have over temperature protection when operating as a three phase motor.

It is also desirable that the three phase motor overload protective system be readily adapted for use as an overload protective system for a single phase motor where a single sensor is used.

Further, it is desirable that the number of elements used be held to a minimum and that the elements used have a high degree of reliability.

Accordingly, it is an object of the invention presented to provide an improved temperature responsive electrical control system which responds rapidly to temperature changes and can be controlled from more than one temperature responsive sensors with a minimum of detrimental interaction with the system responding to any one or more of the sensors detecting the set point temperature.

A further object is to connect the sensors in parallel circuits in such a manner that failure of a single sensor does not make it impossible to modify the circuitry so protection can be restored for three phase operation of a motor.

Another object is to provide a circuit in which the average impedance of the sensors is not used to determine when the motor is to be disconnected from the power source.

Still another object is to provide an improved temperature responsive electrical control system employing a single phase sensitive switch means such as a thyristor which can be used to provide overload protection for three phase and single phase motors.

A further object is to provide an improved temperature responsive electrical control system using a thyristor as the switching element which is biased in the "on" mode with the biasing current controlled in a novel manner by a bridge circuit network employing more than one thermally responsive sensors.

A thorough understanding of the invention and details of the manner in which these and other objects are attained in accordance with the invention may be obtained by reference to the remaining portion of the specification and the accompanying drawing in which a preferred embodiment of the invention is illustrated by way of example.

For purposes of illustration the electrical control system embodying the invention is connected to control the circuitry for connecting and disconnecting a motor 10 from its three phase supply lines L1, L2 and L3. For purposes of illustration the motor 10 is shown having stator windings F1, F2 and F3 which are star-connected. An electroresponsive contactor normally forms a part of the circuitry for connecting and disconnecting a motor from its source of three phase power. Thus, there is shown a contactor 12 having normally open contacts 12a, 12b and 12c connected in lines L1, L2 and L3 with the free ends of stator windings F1, F2 and F3, respectively. The contactor 12 has an operating coil 12d, which when energized, effects the closure of contacts 12a, 12b and 12c essential to the energization of the stator windings F1, F2 and F3.

The remaining circuitry shown in the drawing controls the energization of the operating coil 12d of contactor 12. This circuitry can be considered as having two major portions. One portion is the phase sensitive switching means 14 enclosed by the dotted lines. The other or remaining portion is a bridge circuit network producing an output signal in accordance with the temperature of the stator windings of motor 10. The bridge network output is applied to the phase sensitive switch means 14 to control its mode of operation in accordance with the temperatures sensed at the motor windings F1, F2 and F3.

The switch means 14 includes a phase sensitive electronic switch device, such as a thyristor, i.e., a semiconductor device having control characteristics similar to those of thyratron tubes. A silicon controlled rectifier (SCR) is one phase sensitive electronic switch of the general type mentioned that has been found to be satisfactory. It is identified in the drawing by the reference numeral 16.

A silicon controlled rectifier (SCR) has three electrodes, an anode, cathode and gate. These are identified in the drawing by reference numerals 18, 20 and 22, respectively. An SCR is a semiconductor device which, as the name indicates, conducts current primarily in one direction. However, unlike a conventional rectifier, the SCR will not present a low internal resistance to current flow in the forward direction unless the anode voltage is positive with respect to the cathode and exceeds a certain minimum voltage called the forward breakdown voltage. The SCR 16 has its anode 18 electrically connected to the upper end of the secondary winding of a transformer 24 via the winding of an electric translating device such as electric relay 26. Cathode 20 is connected to one output terminal of the bridge circuit network which is the center tap connection 28 of the secondary transformer winding. The transformer 24 is connected to the A.C. supply lines L1 and L2 to provide an alternating voltage between the anode 18 and cathode 20. A 24 v. transformer has been used for transformer 24 so 12 v. is applied to the anode-cathode circuit portion. The 12 volts alone will not cause the SCR 16 to conduct in the forward direction, i.e., anode to cathode. A positive voltage applied between the anode 18 and cathode 20, however, exceeds the minimum forward breakdown voltage when the gate 22 has a voltage applied to it which is positive with respect to the cathode 20 and is applied at the same time the forward voltage is present at the anode 18. The nominal gate voltage required is .6 v. at 25° C. and decreases slightly at a substantially uniform linear rate with an increase in temperature. When the forward breakdown voltage required is thus modified by such a gate signal, the high internal resistance of the device changes to a very low value to permit a high current flow through the device. Once the SCR is triggered by the gate signal to the "on" mode of operation the current flow is independent of gate voltage or current and the SCR remains in the high conduction "on" mode until the anode current is reduced to a level below that required to sustain conduction.

Since the circuit as shown in the drawing is energized by an alternating current source the anode to cathode voltage is sinusoidal. It is therefore necessary that the gate to cathode voltage be positive at some point during each positive half cycle of the voltage appearing across the anode to cathode in order to place the SCR 16 in the "on" mode of operation and maintain it in the "on" mode of operation. The duration of the current flow during each positive half cycle is, of course, determined by the point in the positive half cycle when the positive gate to cathode voltage signal has been presented to place the SCR 16 in the "on" mode. The phase sensitive switch means 14 as described up to this point does not have any means for supplying a gate signal to the SCR 16. A simple biasing circuit is provided which is effective to bias the SCR 16 for "on" mode operation. The biasing circuit is basically a voltage divider and as illustrated includes two series connected resistors 30 and 32 connected between the upper end of the secondary winding of transformer 24 and cathode 20 of SCR 16. The gate 22 is connected to the common connection 34 for the two resistors 30 and 32. It is thus apparent that the voltage measured from connection 34 to cathode 20, i.e., across resistor 32, due to current flow through the resistors 30 and 32 is in phase with the voltage measured from the anode 18 to the cathode 20. Thus, the SCR 16 is turned "on" when the voltage at anode 18 is positive with respect to cathode 20 and the voltage drop across resistor 32 is at least .6 v., i.e., the breakdown or gating voltage for an SCR. The values of resistors 30 and 32 are chosen so the maximum instantaneous voltage developed across resistor 32 is high enough so the .6 v. breakdown voltage level is reached sufficiently early in the cycle to provide the power needed to energize the relay 26. It is possible, of course, to use a capacitor in series with the resistor 30 to cause the current through the biasing circuit to lead the voltage across the anode to cathode so the voltage developed across resistor 32 will be well above the .6 v. breakdown voltage as soon as the voltage from anode to cathode is positive. This, of course, means the SCR 16 will conduct for a full half cycle thus maximizing the power available for operating the relay 26. Since the relay 26 is energized for only one half of each cycle or less, a diode 36 is connected across the relay winding for relay 26. The impedance presented by the relay 26 is inductive and therefore tends to keep the current flowing. This inductive characteristic is utilized by connecting the diode 36 so any current flow through the relay winding will tend to continue in the same direction beyond the point when the SCR 16 is turned "off." With this arrangement relay 26 will not drop out during the "off" portion or negative half of each cycle. A capacitor 38 is connected between gate 22 and cathode 20. It provides a low impedance path for any high voltage pulses that may appear in the A.C. voltage applied to the transformer 24 and thus prevents the SCR 16 from being damaged by such pulses.

The relay 26 has two sets of contacts 40 and 42 which are closed when the relay is energized and open when the relay is de-energized. Contacts 40 are connected in series with the winding 12d of contactor 12 and thus control the operation of the contactor 12 and, therefore, the energization and de-energization of winding F1, F2 and F3 of motor 10. The circuit for winding 12d is connected to the alternating current supply. In the drawing the circuit is shown connected to supply lines L1 and L2.

With the phase sensitive switch means 14 connected as described up to this point SCR 16 will be in the "on" mode of operation. The remaining portion of the circuitry, i.e., the bridge circuit network, provides the means for placing the switch means 14 in the "off" mode when one or more of the windings in the motor 10 reach what is considered an unsafe temperature level and also functions to return the switch means 14 to the "on" mode after the temperature of the motor windings has dropped to a desired level.

The bridge circuit network is energized via the step-down transformer 24 with the upper half 44 of the secondary winding providing one leg for the bridge network and the lower half 46 providing a second leg. As has been mentioned, the center tap 28 provides one output terminal of the bridge network. It is readily apparent that the bridge network includes two basic bridge circuits in which the upper and lower halves of the secondary winding provide two legs 44 and 46 in each bridge circuit. A first bridge circuit presented when the phase sensitive switch means 14 is in the "on" mode of operation includes the two legs 44 and 46, a third leg of series connected elements connected to the leg 44 including the contacts 42 of relay 26 which are then closed, resistance 48, resistance 50, thermally responsive resistance 52 and resistance 54 and a fourth leg formed by resistance 56 connected in series between the third leg and leg 46. The connection 58 common to third and fourth legs of the first bridge circuit which can be considered an output terminal for the first bridge circuit is connected to the output terminal 60 for the network via a diode 62. The diode 62 is connected with its anode connected to the output terminal 60 and its cathode connected to the connection 58. The thermally responsive resistance 52 is, of course, positioned in the motor 10 to sense the temperature at one of the windings. It is shown in the drawing positioned to sense the temperature of winding F3. A resistance 64 is connected between the upper end of leg 44 and the connection 66 between contacts 42 and resistance 48. The contacts 42 of relay 26, therefore, short out resistance 64 when the SCR 16 is in the "on" mode of operation. When the SCR 16 is in the "off" mode of operation the contacts 42 open so the third leg of the first bridge circuit just described is modified by the addition of resistance 64 to the third leg since the short circuit established by contacts 42 when closed is removed by the opening of contacts 42.

The circuitry as described up to this point, i.e., the phase sensitive switch means 14 and the first bridge circuit of the bridge circuit network, provides a control system which is sutiable for controlling a single phase motor. Operation of the circuitry when so used will therefore be discussed.

Since the mode of operation for the SCR 16 is determined only during the positive half of each cycle, i.e. when the voltage presented from the anode 18 to the cathode 20 is positive, it is only necessary that the operation of the circuit be considered for such positive half cycles. As has been mentioned, without the bridge circuitry connected the SCR 16 is placed in the "on" mode of operation via the biasing circuit including resistors 30 and 32. The point 34, which is the connection common to resistors 30 and 32, must be at least .6 v. positive with respect to the output terminal 28 at some portion of the positive half cycle to turn the SCR 16 "on." The first bridge circuit described functions in response to the temperature sensed by the sensor 52 to reduce the biasing voltage below the required .6 v. gating signal to cause the SCR 16 to be placed in the "off" mode. The sensor 52 has a positive temperature coefficient of resistance. The resistance of 52 therefore increases with an increase in temperature causing a corresponding increase in the magnitude of the voltage drop across the third leg of the bridge. The voltage across the resistance 56, of course, decreases an equal amount. When the sensor 52 is responding to the normal or acceptable operating temperature of the motor winding, resistances presented by the third and fourth legs of the first bridge circuit are such that the point 58 is positive with respect to point 60 during the positive half cycles. This being the case there is no current flow from point 60 to point 58 via the diode 62 to alter the gating signal for the SCR 16. As the temperature sensed rises the voltage drop across the third leg of the first bridge circuit during the positive half cycles increases until point 58 is negative with respect to point 60 by an amount sufficient to cause the diode 62 to present a low impedance path for current flow from point 60. The current passing from point 60 through diode 62 during each positive half cycle also passes through resistance 30 causing the voltage drop across resistance 30 to increase and thereby reducing the voltage drop across resistance 32. The current flow through diode 62 increases with further increase in the temperature sensed causing a further increase in the voltage drop across resistance 30 and a further decrease in the voltage appearing across resistance 32 until the voltage drop across resistance 32 has decreased to the point where it is not sufficient to place the SCR 16 in the "on" mode. The action of the first bridge circuit is thus effective to place the SCR 16 in the "off" mode of operation. The temperature at which the "off" mode is established corresponds to the temperature which is considered unsafe for further operation of the motor 10 and will be referred to as the set point temperature for the system.

With the SCR 16 thus placed in the "off" mode of operation the relay 26 is de-energized causing the contacts 40 and 42 to open. The opening of contacts 40 is effective to cause the contactor 12 to be de-energized to terminate the flow of current to the motor being protected. The opening of contacts 42 removes the short circuit around resistance 64 which is thus added to the resistance presented by the third leg of the first bridge circuit. If the resistance 64 were not added the SCR 16 would be returned to the "on" mode of operation as soon as the temperature sensed by sensor 52 had dropped the few degrees required to cause the voltage at point 58 to increase above the voltage at point 60 during the positive half cycles and thus prevent the diode 62 from conducting. This reset temperature for the circuit can be reduced to the level desired by the addition of resistance 64. The magnitude of resistance 64 added, of course, is directly proportional to the reduction of the reset temperature. This automatic modification of the first bridge circuit which is accomplished when the SCR 16 is placed in the "off" mode due to the sensor responding to an unsafe temperature to automatically reduce the reset temperature for the system is desirable for many applications since it gives the system which caused the motor to be overloaded an opportunity to correct itself before it is reset to again energize the motor being protected. It is apparent, of course, that the fourth leg of the first bridge could be modified by reducing the resistance of the fourth leg to obtain the desired reduction in the reset temperature. One possible way to accomplish this is to place the resistance 64 in series with resistance 56 and have it shorted out by a set of contacts controlled by relay 26 which unlike contacts 40 close when the relay 26 is de-energized and are opened when the relay 26 is energized.

While the invention presented herein has been shown to be useful for application where a single temperature is being monitored, it is of particular importance when it is used in connection with the sensing of temperature at more than one point and having any one or more of the sensors effective to change the operation of the system when responding to the set point temperature. Consideration will therefore be given to the operation of the entire circuitry shown in the drawing.

Up to this point the description of the circuitry has been limited to the phase sensitive switch means 14 and the first bridge circuit of the bridge circuit network connected to determine the mode of operation of the switch means 14. The second bridge circuit is essentially a duplication of the first bridge circuit and, therefore, where possible, some elements of the first bridge circuit are also used in the second bridge circuit. The value in having some of the elements common to both bridge circuits would appear to be limited to the economic savings generated by the elimination of a number of elements. This, however, is not the case. As will be explained later, the use of some of the elements as parts in both bridge circuits also helps to minimize an undesirable shift in the set point temperature of the system which would otherwise occur under certain operating conditions.

The upper and lower halves 44 and 46 respectively, of the secondary winding of the transformer 24 also provide the first and second legs of the second bridge circuit. Contacts 42 for the shorting circuit for resistance 64, resistance 48 and resistance 50 are the remaining elements of the first bridge circuit which also form a part of the third leg of the second bridge circuits. The remainder of the third leg for the second bridge circuit is made up of the thermally responsive resistance sensor 68 positioned to sense the winding F1 of motor 10, and resistance 70 connected in series with it. Sensor 68 also has a positive temperature coefficient of resistance. Sensors 52 and 68 are connected to resistance 50 at a common connection 72. The fourth leg of the second bridge circuit is formed by resistance 74 which is connected at 76 to resistance 70 and to the connection 78 which is common to the lower half of the secondary winding of transformer 24 and resistance 56. The connection 76, which is common to legs three and four of the second bridge circuit and is one terminal output of the second bridge circuit, is connected to the output terminal 60 of the bridge circuit network via diode 80 which is poled in the same direction as diode 62, i.e., the anode is connected at connection 60.

When the circuitry is used for the protection of three phase motors as illustrated in the arrangement shown in the drawing, the sensors 52 and 68 will be responding to a given temperature at about the same time since the windings will usually change in temperature at about the same rate. When such is the case, both of the diodes 62 and 80 will conduct when the set point temperature is sensed by sensors 52 and 68 with the current through each of the diodes serving to increase the voltage drop across resistance 30 and therefore decrease the voltage across resistance 32 to the point where SCR 16 is placed in the "off" mode of operation. The resistance 64 is placed in the circuitry as before when the SCR 16 is in the "off" mode to provide a reset temperature which is below the set point temperature to provide the desired delay before the SCR is returned to the "on" mode of operation.

There are situations, however, when the sensor 52 responds to the set point temperature before sensor 68 or vice versa. Assume it is sensor 52 which is responding to the set point temperature before sensor 68. The second bridge circuit will not have any current passing through diode 80 and resistance 74 to increase the voltage drop across resistance 30 and thereby aid in turning off the SCR 16. It is therefore necessary that diode 62 conduct to a greater degree to produce the needed reduction in the voltage across resistance 32 to cause the SCR 16 to be placed in the "off" mode of operation. If resistance 50, which is common to the first and second bridge circuits, were not used in the circuits the sensor 52 would have to respond to a temperature above the desired set point temperature in order to have the voltage at 58 sufficiently negative to obtain the necessary increase in current flow through diode 62 to cause the SCR 16 to be placed in the "off" mode. However, with resistance 50 in the circuit this undesirable shift in the set point does not occur. The voltage at connection 72, which is common to the sensors 52 and 68, is a function of the current flowing through the two branches including sensors 52 and 68. The voltage drop across resistance 50 is, of course, directly proportional to the current flow through it. Since sensors 52 and 68 have positive temperature coefficients of resistance, the current through resistance 50 due to sensor 68 and the resistances 70 and 74 will be greater when sensor 68 is responding to a temperature below the set point than when it is responding to the set point temperature. Therefore, sensor 68 when responding to a temperature below the set point will depress the voltage at point 72. The increase in voltage drop across sensor 52 needed to decrease the voltage at point 58 to obtain the necessary increase in current flow through diode 62 will be less. Therefore, for the case just described the sensor 52 will be responding to a temperature which is closer to the set point than it would in a circuit not using resistance 50 connected as described.

Earlier it was mentioned that the nominal gate voltage required for a silicon control rectifier is .6 v. at 25° C. and decreases slightly at a substantially uniform linear rate with an increase in temperature. In most applications the ambient temperature at the SCR 16 will vary over a substantial range making it necessary to compensate for the resulting change in the gate voltage required. If the circuit did not provide compensation for this change in the gate voltage, the set point temperature would rise with an increase in the ambient temperature of the SCR 16 i.e., a greater increase in the resistance presented by the sensors 52 and 68 would be needed to place the SCR 16 in the "off" mode when there is an increase in the ambient temperature at the SCR 16. Compensation is provided by the resistance 48 which has a positive temperature coefficient of resistance. Resistance 48 is positioned where it will be responding to the ambient temperature at the SCR 16. It is, of course, in series with the sensors 52 and 68 and will therefore provide the needed incremental increase or decrease in resistance to compensate for the change in the gate voltage caused by an increase or decrease in the ambient temperature.

Mention should also be made of the function of resistances 54 and 70. These resistors are added for calibration purposes to permit adjustment of the circuits when they are assembled to provide the set point temperatures specified by a user. While resistances 54 and 70 are shown as single resistors, the variation in the resistance to be presented is normally obtained by using a given resistor and paralleling it with another resistor of the required value to provide the needed resistance at 54 and 70.

Now that the operation of the circuitry shown in the drawing has been covered it is possible to discuss the "fail-safe" aspects of the system. It should be noted that the SCR 16 is normally in the "on" mode of operation. Therefore, if the SCR 16 should fail for some reason the relay 26 would be de-energized causing the current flow to the motor windings to be terminated. In addition, if either of the resistors 30 and 32 should open the SCR 16 will be placed in the "off" mode since a gating signal will not be presented causing the system to shut down. Also, if either of the sensors 52 and 68 should fail the SCR 16 would be placed in the "off" mode to cause the current flow to the motor windings to be terminated.

In addition to the "fail-safe" features of the circuitry, it should be noted that the circuit will provide protection for a three phase motor should one of the power lines or windings open causing it to operate as a single phase motor. As has been mentioned single phase operation of a three phase motor will cause the temperature of the windings to rise to unsafe levels if the motor is operating with a normal load or greater. Unlike other known thermal responsive electrical control systems in which the sensors are connected so the switching action is in response to the average temperatures sensed by the sensors, the circuitry presented herein has the sensors arranged so that both or either can respond to the set point temperature to initiate the switching action to de-energize the motor. Further, since both or either sensor in the circuitry presented herein can respond to the set point temperature to initiate the switching action at the set point temperature, only two sensors need to be used to provide protection during three phase and single phase operation of a Y-connected three phase motor.

Another advantage to the circuitry presented herein is the fact that a three phase motor can be returned to operation with full protection for three-phase operation should one of the sensors 52 or 68 open for some reason. If one of the sensors 52 or 68 should open while the three phase motor 10 is in operation, the SCR 16 will be placed in the "off" mode since the open-circuited sensor is then presenting an infinite impedance. With the SCR 16 changing to the "off" mode the contactor 12 is de-energized since the contacts 40 open upon de-energization of the relay 26 which is under the direct control of the SCR 16. The motor can be placed in operation again by shorting out the defective sensor. While the motor will not be protected against overheating should a winding open causing it to operate as a single phase motor, it will be protected from thermal damage due to a locked rotor condition or any other over-loading causing the windings to overheat. The advantage of the circuitry presented herein which allows the motor to be operated even though one of the sensors has opened is particularly important where the operation of the motor cannot be discontinued until a new motor is obtained. Such would be the case in many refrigeration and air-conditioning systems and continuous processing operations.

While the circuit has been shown applied to provide protection for a Y or star wound three phase motor, it can also be used to provide protection for a delta wound three phase motor. However, in the case of a delta wound three phase motor three sensors are used, one for each winding, to provide protection in the event of single phase operation of the motor. In such case a third sensor is connected in the same manner as sensors 52 and 68.

It is apparent that the circuit can be used for controlling the energization of circuitry other than motors and the bridge circuits making up the bridge circuit network can have different set points as may be required. Further, the sensors need not be limited to thermal responsive sensors, but can be any type of transducer which provides a variable impedance output in response to the condition or variable being sensed.

It will be apparent that various changes may be made in the circuitry herein described without departing from the scope of the invention as defined in the appended claims.

What is claimed is:
1. In a condition responsive control circuit, the combination comprising:
    an A.C. bridge circuit having first and second output terminals at which an output signal is presented which varies in phase and magnitude dependent on the direction and magnitude of unbalance of the bridge, said bridge circuit including a condition responsive impedance which varies in magnitude in response to changes in the condition to which said impedance is responsive causing the direction and magnitude of unbalance of the bridge to change;

a phase sensitive switch means having a control terminal, said switch means having a first and second mode of operation determined by the phase and magnitude of a signal presented at said control terminal; and means including a unidirectional current carrying device connecting asid output signal of said A.C. bridge circuit to said control terminal.

2. In a condition responsive control circuit, the combination comprising:

an A.C. bridge network with first and second output terminals, said network having a plurality of bridge circuits, each of said bridge circuits having an input signal supplied to it from a common A.C. source, each of said bridge circuits having an output at which is presented an output signal having a phase and magnitude determined by the direction and magnitude of unbalance of the bridge circuit, each of said bridge circuits having a condition responsive impedance which varies in magnitude in response to the condition to which said impedance is responsive causing the direction and magnitude of unbalance of its bridge circuit to change;

a phase sensitive switch means having a control terminal, said switch means having a first and second mode of operation determined by the direction and magnitude of current flow at said control terminal;

a plurality of unidirectional current carrying devices, one for each of said plurality of bridge circuits;

means connecting each of said devices between said first output terminal and the output of a different one of said plurality of bridge circuits; and means connecting said first output terminal to said control terminal causing the magnitude of current flow at said control terminal to be varied by the current flow between said first output terminal of said network and said plurality of bridge circuits.

3. The condition responsive control circuit of claim 2 wherein said phase sensitive switch means includes a thyristor having a gate electrode connected to said control terminal.

4. The condition responsive control circuit of claim 3 wherein said thyristor is a silicon controlled rectifier.

5. In a condition responsive control circuit, the combination comprising:

an A.C. power source;

a plurality of bridge circuits, each of said bridge circuits having an input signal supplied to it from said A.C. power source, each of said bridge circuits having two output terminals at which is presented an output signal having a phase and magnitude determined by the direction and magnitude of unbalance of the bridge circuit, each of said bridge circuits having a condition responsive impedance which varies in magnitude in response to the condition to which said impedance is responsive causing the direction and magnitude of unbalance of its bridge circuit to change;

a phase sensitive switch means including a biasing circuit connected between one of said two output terminals of each of said bridge circuits and said A.C. power source;

a plurality of unidirectional current carrying devices, one for each of said bridge circuits;

means connecting each of said devices between a point intermediate the ends of said biasing circuit and the other of said two terminals of a different one of said bridge circuits, with each of said devices poled in the same direction; and said switch means having a control terminal connected to said point intermediate the ends of said biasing circuit, said switch means having a first and second mode of operation determined by the direction and magnitude of current flow between said control terminal and the other of said two terminals of each of said bridge circuits.

6. The condition responsive control circuit of claim 5 wherein said phase sensitive switch means has an electrical output serving to alter said plurality of bridge circuits so as to magnify a change in the current flow between said control terminal and the other of said two terminals of each of said bridge circuits which effects a change in the mode of operation of said switch means.

7. In a condition responsive control circuit, the combination comprising:

a first bridge circuit having first, second, third and fourth legs connected in series in that order, the connection between said third and fourth legs providing one output terminal for said first bridge circuit;

means applying an A.C. input signal for said first bridge circuit to said first and second legs;

a second bridge circuit having four series connected legs, two of said four legs being said first and second legs of said first bridge circuit and a portion of one of said third and fourth legs of said first bridge circuit included in one of the two remaining legs of said second bridge circuit, the connection between said two remaining legs providing one output terminal for said second bridge circuit;

a second output terminal for said first and second bridge circuits being the connection between said first and second legs;

a first condition responsive impedance which varies in magnitude in response to changes in the condition to which said first impedance is responsive included in one of said third and fourth legs;

a second condition responsive impedance which varies in magnitude in response to changes in the condition to which said second impedance is responsive included in one of said two remaining legs;

a phase sensitive switch means connected between the ends of said second leg of said first bridge circuit, said switch means including a control terminal, said switch means having a first and second mode of operation determined by the phase and magnitude of a signal presented between said control terminal and said second output terminal;

a first unidirectional current carrying device connected between said control terminal and said one output terminal for said first bridge circuit; and a second unidirectional current carrying device, poled in the same direction as said first device, connected between said control terminal and said one output terminal for said second bridge circuit;

said first and second unidirectional current carrying devices permitting the signal between said control terminal and said second output terminal for changing the mode of operation of said phase sensitive switch means to be provided by either or both of said first and second bridge circuits.

8. The condition responsive control circuit of claim 7 wherein said phase sensitive switch means has an electrical output serving to alter said first and second bridge circuit so as to magnify a change in the signal presented between said control terminal and said second output terminal which effects a change in the mode of operation of said phase sensitive switch means.

9. The condition responsive control circuit of claim 7 wherein said phase sensitive switch means has an electrical output serving to alter said portion of one of said third and fourth legs so as to magnify a change in the signal presented between said control terminal and said second output terminal which effects a change in the mode of operation of said phase sensitive switch means.

10. In a condition responsive control circuit, the combination comprising:
- a first bridge circuit having first, second, third and fourth legs connected in series in that order, the connection between said third and fourth legs providing one output terminal for said first bridge circuit;
- means applying an A.C. input signal for the bridge network to said first and second legs;
- a second bridge circuit having four series connected legs, two of said four legs being said first and second legs of said first bridge circuit and a portion of one of said third and fourth legs of said first bridge circuit included in one of the two remaining legs of said second bridge circuit, the connection between said two remaining legs providing one output terminal for said second bridge circuit;
- a second output terminal for said first and second bridge circuits being the connection between said first and second legs;
- a first condition responsive impedance which varies in magnitude in response to changes in the condition to which said first impedance is responsive included in one of said third and fourth legs;
- a second condition responsive impedance which varies in magnitude in response to changes in the condition to which said second impedance is responsive included in one of said two remaining legs;
- said portion of one of said third and fourth legs included in one of the two remaining legs of said second bridge circuit presenting an impedance which causes the magnitude of said first impedance required to obtain a given output signal from said first bridge circuit to be influenced by the degree of unbalance of said second bridge circuit and vice versa;
- a phase sensitive switch means connected between the ends of said second leg of said first bridge circuit; said switch means including a control terminal, said switch means having a first and second mode of operation determined by the phase and magnitude of a signal presented between said control terminal and said second output terminal;
- a first unidirectional current carrying device connected between said control terminal and said one output terminal for said first bridge circuit; and
- a second unidirectional current carrying device, poled in the same direction as said first device, connected between said control terminal and said one output terminal for said second bridge circuit;
- said first and second unidirectional current carrying devices permitting the signal between said control terminal and said second output terminal for changing the mode of operation of said phase sensitive switch means to be provided by either or both of said first and second bridge circuits.

11. In an A.C. bridge network, the combination comprising:
- a first bridge circuit having first, second, third and fourth legs connected in series in that order, the connection between said third and fourth legs providing one output terminal for said first bridge circuit;
- means applying an A.C. input signal for the bridge network to said first and second legs;
- a second bridge circuit having four series connected legs, two of said four legs being said first and second legs of said first bridge circuit and a portion of one of said third and fourth legs of said first bridge circuit included in one of the two remaining legs of said second bridge circuit, the connection between said two remaining legs providing one output terminal for said second bridge circuit;
- a second output terminal for said first and second bridge circuits being the connection between said first and second legs;
- a first condition responsive impedance which varies in magnitude in response to changes in the condition to which said first impedance is responsive included in one of said third and fourth legs;
- a second condition responsive impedance which varies in magnitude in response to changes in the condition to which said second impedance is responsive included in one of said two remaining legs;
- said portion of one of said third and fourth legs included in one of the two remaining legs of said second bridge circuit presenting an impedance which causes the magnitude of said first impedance required to obtain a given output signal from said first bridge circuit to be influenced by the degree of unbalance of said second bridge circuit and vice versa.

12. In an A.C. bridge network for changing the voltage presented by a biasing circuit in response to the changes in the magnitude of impedance presented by a plurality of condition responsive impedances included in the network, the combination including:
- a first A.C. bridge circuit having first, second, third and fourth legs connected in series in that order;
- means applying an A.C. input signal across said first and second legs;
- a biasing circuit connected in parallel with one of said first and second legs;
- a connection intermediate the ends of said biasing circuit;
- a first unidirectional current carrying device connected between said connection and the connection between said third and fourth legs;
- a first condition responsive impedance which varies in magnitude in response to changes in the condition to which said impedance is responsive included in one of said third and fourth legs;
- a second A.C. bridge circuit having first, second, third and fourth legs connected in series in that order, said first and second legs of said second bridge being said first and second legs of said first bridge circuit and one of said third and fourth legs of said second bridge circuit including a portion of one of said third and fourth legs of said first bridge circuit;
- a second unidirectional current carrying device connected between said connection intermediate the ends of said biasing circuit and the connection between said third and fourth legs of said second bridge circuit, said second device being poled in the same direction as said first device; and
- a second condition responsive impedance which varies in magnitude in response to changes in the condition to which said second impedance is responsive included in one of said third and fourth legs of said second bridge circuit.

13. The A.C. bridge network of claim 12 wherein said portion of one of said third and fourth legs of said first bridge circuit is selected to present an impedance which causes the magnitude of said first condition responsive impedance required to obtain a desired level of current flow through said first unidirection current carrying device to be influenced by the degree of unbalance of said second bridge circuit and causes the magnitude of said second condition responsive impedance required to obtain a desired level of current flow through said second unidirectional current carrying device to be influenced by the degree of unbalance of said first bridge circuit.

14. In a condition responsive control circuit, the combination comprising:
- an A.C. bridge network with first and second network output terminals, said bridge network including
- a first bridge circuit having first, second, third and fourth legs connected in series in that order with the connection between said first and second legs being one output terminal for said first bridge circuit and said first network output terminal and the connection between said third and fourth legs being a second output terminal for said first bridge circuit, one of said third and fourth legs having a first condition responsive impedance which varies in magnitude in response to changes in the condition to which said first impedance is responsive, said first bridge circuit presenting an output signal which varies in phase and magnitude dependent on the direction and magnitude of unbalance of said first bridge circuit;

means applying an A.C. input signal across said first and second legs;

a biasing circuit including two series connected impedances with one end connected to said one output terminal for said first bridge circuit and the other end connected to the connection between said second and third legs of said first bridge circuit;

a silicon controlled rectifier having an anode, cathode and gate with said anode connected via an electric translating device to said other end of said biasing circuit, said cathode connected to said one end of said biasing circuit and said gate connected to said second network output terminal and the connection common to said series connected impedance included in said biasing circuit;

a second bridge circuit having four series connected legs, two of said four legs being said first and second legs of said first bridge circuit and one of the remaining two of said four legs of said second bridge circuit including a portion of one of said third and fourth legs of said first bridge circuit connected to a second condition responsive impedance, said second impedance varying in magnitude in response to changes in the condition to which said second impedance is responsive, said second bridge circuit presenting an output signal between said one output terminal and the connection between the remaining two of said four legs which varies in phase and magnitude dependent on the direction and magnitude of unbalance of said second bridge circuit;

a first diode connected between said second network output terminal and said second output terminal for said first bridge circuit;

and a second diode connected between said second network output terminal and said connection between the remaining two of said four legs of said second bridge circuit, said first and second diodes being poled in the same direction; and said biasing circuit being effective to provide a signal at said gate to place said silicon controlled rectifier in the "on" mode of operation only when the combined current through said first and second diodes is below a predetermined level, current flow through said first diode being controlled by the output signal presented by said first bridge circuit and current flow through said second diode being controlled by the output signal presented by said second bridge circuit.

15. In a condition responsive control circuit, the combination comprising:

an A.C. bridge network with first and second network output terminals, said bridge network including a first bridge circuit having first, second, third and fourth legs connected in series in that order with the connection between said first and second legs being one output terminal for said first bridge circuit and said first network output terminal and the connection between said third and fourth legs being a second output terminal for said first bridge circuit, one of said third and fourth legs having a first condition responsive impedance which varies in magnitude in response to changes in the condition to which said first impedance is responsive, said first bridge circuit presenting an output signal which varies in phase and magnitude dependent on the direction and magnitude of unbalance of said first bridge circuit;

a transformer having a primary winding and a secondary winding, said secondary winding having a connection intermediate its ends dividing said secondary winding into two portions, said first and second legs of said first bridge circuit being formed from said two portions of said secondary winding and said connection intermediate the ends of said secondary winding being said one output terminal for said first bridge circuit;

a biasing circuit including two series connected impedances with one end connected to said one output terminal for said first bridge circuit and the other end connected to the connection between said second and third legs of said first bridge circuit;

a silicon controlled rectifier having an anode, cathode and gate with said anode connected via an electric translating device to said other end of said biasing circuit, said cathode connected to said one end of said biasing circuit and said gate connected to said second network output terminal and the connection common to said series connected impedances included in said biasing circuit;

a second bridge circuit having four series connected legs, two of said four legs being said first and second legs of said first bridge circuit and one of the remaining two of said four legs of said second bridge circuit including a portion of one of said third and fourth legs of said first bridge circuit connected to a second condition responsive impedance, said second impedance varying in magnitude in response to changes in the condition to which said second impedance is responsive, said second bridge circuit presenting an output signal between said one output terminal and the connection between the remaining two of said four legs which varies in phase and magnitude dependent on the direction and magnitude of unbalance of said second bridge circuit;

a first diode connected between said second network output terminal and said second output terminal for said first bridge circuit;

and a second diode connected between said second network output terminal and said connection between the remaining two of said four legs of said second bridge circuit, said first and second diodes being poled in the same direction; and said biasing circuit being effective to provide a signal at said gate to place said silicon controlled rectifier in the "on" mode of operation only when the combined current through said first and second diodes is below a predetermined level, current flow through said first diode being controlled by the output signal presented by said first bridge circuit and current flow through said second diode being controlled by the output signal presented by said second bridge circuit.

16. In a condition responsive control circuit, the combination comprising:

an A.C. bridge network with first and second network output terminals, said bridge network including a first bridge circuit having first, second, third and fourth legs connected in series in that order with the connection between said first and second legs being one output terminal for said first bridge circuit and said first network output terminal and the connection between said third and fourth legs being a second output terminal for said first bridge circuit, said third leg having a first condition resopnsive impedance which varies in magnitude in response to changes in the condition to which said first impedance is responsive, said first bridge circuit presenting an output signal which varies in phase and magnitude dependent on the direction and magnitude of unbalance of said first bridge circuit;

means applying an A.C. input signal across said first and second legs;

a biasing circuit including two series connected impedances with one end connected to said one output terminal for said first bridge circuit and the other end connected to the connection between said second and third legs of said first bridge circuit;

a silicon controlled rectifier having an anode, cathode and gate with said anode connected via an electric translating device to said other end of said biasing circuit, said cathode connected to said one end of said biasing circuit and said gate connected to said second network output terminal and the connection common to said series connected impedances included in said biasing circuit;

a second bridge circuit having four series connected legs, two of said four legs being said first and second legs of said first bridge circuit and the third leg of said second bridge circuit including a portion of said third leg of said first bridge circuit connected to a second condition responsive impedance, said second impedance varying in magnitude in responsive to changes in the condition to which said second impedance is responsive, said second bridge circuit presenting an output signal between said one output terminal and the connection between the remaining two of said four legs which varies in phase and magnitude dependent on the direction and magnitude of unbalance of said second bridge circuit;

a first diode connected between said second network output terminal and said second output terminal for said first bridge circuit;

and a second diode connected between said second network output terminal and said connection between the remaining two of said four legs of said second bridge circuit, said first and second diodes being poled in the same direction; and said biasing circuit being effective to provide a signal at said gate to place said silicon controlled rectifier in the "on" mode of operation only when the combined current through said first and second diodes is below a predetermined level, current flow through said first diode being controlled by the output signal presented by said first bridge circuit and current flow through said second diode being controlled by the output signal presented by said second bridge circuit.

17. In a condition responsive control circuit, the combination comprising:

an A.C. bridge network with first and second network output terminals, said bridge network including a first bridge circuit having first, second, third and fourth legs connected in series in that order with the connection between said first and second legs being one output terminal for said first bridge circuit and said first network output terminal and the connection between said third and fourth legs being a second output terminal for said first bridge circuit, said third leg having a first condition responsive impedance which varies in magnitude in response to changes in the condition to which said first impedance is responsive, said first bridge circuit presenting an output signal which varies in phase and magnitude dependent on the direction and magnitude of unbalance of said first bridge circuit;

a transformer having a primary winding and a secondary winding, said secondary winding having a connection intermediate its ends dividing said secondary winding into two portions, said first and second legs of said first bridge circuit being formed from said two portions of said secondary winding;

a biasing circuit including two series connected impedances with one end connected to said one output terminal for said first bridge circuit and the other end connected to the connection between said second and third legs of said first bridge circuit;

a silicon controlled rectifier having an anode, cathode and gate with said anode connected via an electric translating device to said other end of said biasing circuit, said cathode connected to said one of said biasing circuit and said gate connected to said second network output terminal and the connection common to said series connected impedances included in said biasing circuit;

a second bridge circuit having four series connected legs, two of said four legs being said first and second legs of said first bridge circuit and the third leg of said second bridge circuit including a portion of said third leg of said first bridge circuit connected to a second condition responsive impedance, said second impedance varying in magnitude in response to changes in the condition to which said second impedance is responsive, said second bridge circuit presenting an output signal between said one output terminal and the connection between the remaining two of said four legs which varies in phase and magnitude dependent on the direction and magnitude of unbalance of said second bridge circuit;

a first diode connected between said second network output terminal and said second output terminal for said first bridge circuit;

and a second diode connected between said second network output terminal and said connection between the remaining two of said four legs of said second bridge circuit, said first and second diodes being poled in the same direction; and said biasing circuit being effective to provide a signal at said gate to place said silicon controlled rectifier in the "on" mode of operation only when the combined current through said first and second diodes is below a predetermined level, current flow through said first diode being controlled by the output signal presented by said first bridge circuit and current flow through said second diode being controlled by the output signal presented by said second bridge circuit.

18. Control circuit for terminating the energization of the windings of a polyphase motor in response to one or more said windings exceeding the safe operating temperature for the windings, the combination comprising:

an A.C. bridge network with first and second output terminals, said network having a plurality of bridge circuits, each of said bridge circuits having an input signal supplied to it from a common A.C. source, each of said bridge circuits having an output at which is presented an output signal having a phase and magnitude determined by the direction and magnitude of unbalance of the bridge circuit, each of said bridge circuits having a temperature responsive sensor positioned at a different one of the windings of the polyphase motor causing the output signal of each bridge circuit to change in accordance with the temperature of the winding as sensed by its temperature responsive sensor;

a phase sensitive switch means having a control terminal, said switch means having a first and second mode of operation determined by the current flow at said control terminal, said switch means including a switch positioned in accordance with said first and second modes of operation; said switch when positioned in response to one of said first and second modes of operation serving to permit the flow of current to the windings of the polyphase electric motor and when positioned in response to the other of said first and second modes of operation serving to terminate the flow of current to the windings of the polyphase motor;

a plurality of unidirectional current carrying devices, one for each of said plurality of bridge circuits;

means connecting each of said devices between said first output terminal and the output of a different one of said plurality of bridge circuits; and means connecting said first output terminal of said network to said control terminal causing the current flow at said control terminal to be varied by the current flow between said first output terminal of said network and said plurality of bridge circuits which is a function of the signals presented at said output of each of said plurality of bridge circuits.

19. The control circuit of claim 18 wherein said phase sensitive switch means includes a second switch positioned in accordance with said first and second modes of operation, said second switch serving to alter said bridge network to amplify a change in current flow at said control terminal due to the signals presented at said output of each of said plurality of bridge circuits which is effective to change the mode of operation of said phase sensitive switch means.

20. The control circuit of claim 18 wherein said phase sensitive switch means includes a thyristor having a control electrode connected to said control terminal.

21. The control circuit of claim 20 wherein said thyristor is a silicon controlled rectifier and said control electrode is the gate of said silicon controlled rectifier.

References Cited
UNITED STATES PATENTS

| | | | |
|---|---|---|---|
| 3,032,690 | 5/1962 | Elliot | 317—13 X |
| 3,249,816 | 5/1966 | Courtin et al. | 317—13 X |
| 3,329,869 | 7/1967 | Obenhaus | 317—13 |

MILTON O. HIRSHFIELD, *Primary Examiner.*

J. D. TRAMMELL, *Assistant Examiner.*